United States Patent
Nguyen et al.

(10) Patent No.: US 11,615,240 B2
(45) Date of Patent: Mar. 28, 2023

(54) SYSTEMS AND METHODS FOR A TRANSFORMER NETWORK WITH TREE-BASED ATTENTION FOR NATURAL LANGUAGE PROCESSING

(71) Applicant: salesforce.com, inc., San Francisco, CA (US)

(72) Inventors: Xuan Phi Nguyen, Singapore (SG); Shafiq Rayhan Joty, Singapore (SG); Chu Hong Hoi, Singapore (SG)

(73) Assignee: Salesforce.com, Inc, San Francisco, CA (US)

(*) Notice: Subject to any disclaimer, the term of this patent is extended or adjusted under 35 U.S.C. 154(b) by 477 days.

(21) Appl. No.: 16/581,035

(22) Filed: Sep. 24, 2019

(65) Prior Publication Data

US 2021/0049236 A1 Feb. 18, 2021

Related U.S. Application Data

(60) Provisional application No. 62/887,340, filed on Aug. 15, 2019.

(51) Int. Cl.
G06F 40/205 (2020.01)

(52) U.S. Cl.
CPC .................. *G06F 40/205* (2020.01)

(58) Field of Classification Search
CPC .................................................. G06F 40/205
See application file for complete search history.

(56) References Cited

U.S. PATENT DOCUMENTS

| | | | |
|---|---|---|---|
| 10,282,663 | B2 | 5/2019 | Socher et al. |
| 2016/0350653 | A1 | 12/2016 | Socher et al. |
| 2017/0024645 | A1 | 1/2017 | Socher et al. |
| 2017/0032280 | A1 | 2/2017 | Socher et al. |
| 2017/0140240 | A1 | 5/2017 | Socher et al. |
| 2018/0067923 | A1* | 3/2018 | Chen ................ G06F 40/30 |
| 2018/0082171 | A1 | 3/2018 | Merity et al. |
| 2018/0096219 | A1 | 4/2018 | Socher |
| 2018/0121787 | A1 | 5/2018 | Hashimoto et al. |
| 2018/0121788 | A1 | 5/2018 | Hashimoto et al. |
| 2018/0121799 | A1 | 5/2018 | Hashimoto et al. |
| 2018/0129931 | A1 | 5/2018 | Bradbury et al. |
| 2018/0129937 | A1 | 5/2018 | Bradbury et al. |
| 2018/0129938 | A1 | 5/2018 | Xiong et al. |
| 2018/0143966 | A1 | 5/2018 | Lu et al. |
| 2018/0144208 | A1 | 5/2018 | Lu et al. |
| 2018/0144248 | A1 | 5/2018 | Lu et al. |

(Continued)

OTHER PUBLICATIONS

Voita, Lena, "Evolution of Representations in the Transformer," pp. 1-14. (Year: 2019).*

(Continued)

*Primary Examiner* — Kyle R Stork
(74) *Attorney, Agent, or Firm* — Haynes and Boone, LLP

(57) ABSTRACT

Embodiments described herein provide an attention-based tree encoding mechanism. Specifically, the attention layer receives as input the pre-parsed constituency tree of a sentence and the lower-layer representations of all nodes. The attention layer then performs upward accumulation to encode the tree structure from leaves to the root in a bottom-up fashion. Afterwards, weighted aggregation is used to compute the final representations of non-terminal nodes.

20 Claims, 13 Drawing Sheets

(56) References Cited

U.S. PATENT DOCUMENTS

| | | | |
|---|---|---|---|
| 2018/0268287 | A1 | 9/2018 | Johansen et al. |
| 2018/0268298 | A1 | 9/2018 | Johansen et al. |
| 2018/0300314 | A1* | 10/2018 | Xie .................. G06N 3/08 |
| 2018/0300317 | A1 | 10/2018 | Bradbury |
| 2018/0300400 | A1 | 10/2018 | Paulus |
| 2018/0336198 | A1 | 11/2018 | Zhong et al. |
| 2018/0336453 | A1 | 11/2018 | Merity et al. |
| 2018/0349359 | A1 | 12/2018 | McCann et al. |
| 2018/0373682 | A1 | 12/2018 | McCann et al. |
| 2018/0373987 | A1 | 12/2018 | Zhang et al. |
| 2019/0130206 | A1 | 5/2019 | Trott et al. |
| 2019/0130248 | A1 | 5/2019 | Zhong et al. |
| 2019/0130249 | A1 | 5/2019 | Bradbury et al. |
| 2019/0130273 | A1 | 5/2019 | Keskar et al. |
| 2019/0130312 | A1 | 5/2019 | Xiong et al. |
| 2019/0130896 | A1 | 5/2019 | Zhou et al. |
| 2019/0130897 | A1 | 5/2019 | Zhou et al. |
| 2019/0149834 | A1 | 5/2019 | Zhou et al. |
| 2019/0155862 | A1* | 5/2019 | Yi .................. G06F 16/9535 |
| 2019/0188568 | A1 | 6/2019 | Keskar et al. |
| 2019/0213482 | A1 | 7/2019 | Socher et al. |
| 2019/0251168 | A1 | 8/2019 | McCann et al. |
| 2019/0251431 | A1 | 8/2019 | Keskar et al. |
| 2019/0258714 | A1 | 8/2019 | Zhong et al. |
| 2019/0258939 | A1 | 8/2019 | Min et al. |
| 2019/0286073 | A1 | 9/2019 | Asl et al. |
| 2019/0370389 | A1* | 12/2019 | Blouw .................. G06F 16/3329 |
| 2021/0026922 | A1* | 1/2021 | Wu .................. G06F 40/30 |

OTHER PUBLICATIONS

Nadendla, Harshith, "Why are LSTMs struggling to matchup with Transformers?" pp. 1-10. (Year: 2020).*

Alvarez-Melis et al., Tree-structured decoding with doubly-recurrent neural networks. In Proceedings of the International Conference on Learning Representations (ICLR), 2017, pp. 1-17.

Chen et al., Tree-to-tree neural networks for program translation.In Proceedings of the 32nd International Conference on Neural Information Processing Systems, NIPS'18, pp. 2552-2562, USA, 2018. Curran Associates Inc. URL: https://dl.acm.org/citation.cfm?id=3327144.3327180.

Devlin et al., Bert: Pre-training of deep biderectional transformers for language understanding, arXiv preprint arXiv:1810.04805, 2018.

Eriguchi et al., Tree-to-sequence attentional neural machine translation. In Proceedings of the 54th Annual Meeting of the Association for Computational Linguistics (vol. 1: Long Papers), pp. 823-833, Berlin, Germany, Aug. 2016. Association for Computational Linguistics. doi: 10.18653/v1/P16-1078. URL https: //www.aclweb.org/anthology/P16-1078.

Evans et al., Can neural networks understand logical entailment? In International Conference on Learning Representations, 2018. URL https://openreview.net/forum?id=SkZxCk-0Z.

Frege, uber sinn und bedeutung. Zeitschrift für Philosophie Und Philosophische Kritik, 100 (1):25-50, 1892.

Gü et al.,Top-down tree structured decoding with syntactic connections for neural machine translation and parsing. In Proceedings of the 2018 Conference on Empirical Methods in Natural Language Processing, pp. 401-413. Association for Computational Linguistics, 2018. URL http://aclweb.org/anthology/D18-1037.

Hewitt et al., A structural probe for finding syntax in word representations. In Proceedings of the 2019 Conference of the North American Chapter of the Association for Computational Linguistics: Human Language Technologies, vol. 1 (Long and Short Papers), pp. 4129-4138, 2019.

Hochreiter et al., Long short-term memory. Neural computation, 9(8):1735-1780, 1997.

Lample et al., Cross-lingual language model pretraining. arXiv preprint arXiv:1901.07291, 2019.

Linzen et al., Assessing the ability of lstms to learn syntax-sensitive dependencies. Transactions of the Association for Computational Linguistics, 4:521-535, 2016. ISSN 2307-387X. URL https://transacl.org/ojs/index.php/tacl/article/view/972.

Manning et al., The Stanford CoreNLP natural language processing toolkit. In Associ-ation for Computational Linguistics (ACL) System Demonstrations, pp. 55-60, 2014. URL http://www.aclweb.org/anthology/P/P14/P14-5010.

Ott et al., Scaling neural machine translation. In Proceedings of the Third Conference on Machine Translation (WMT), 2018.

Ott et al., fairseq: A fast, extensible toolkit for sequence modeling. In Proceedings of NAACL-HLT 2019: Demonstrations, 2019.

Radford et al., Improving language understanding by generative pre-training. URL https://s3-us-west-2.amazonaws.com/openai-assets/researchcovers/languageunsupervised/language understanding paper.pdf, 2018.

Senrich et al., Neural machine translation of rare words with subword units. In Proceedings of the 54th Annual Meeting of the Association for Computational Linguistics (vol. 1: Long Papers), pp. 1715-1725. Association for Computational Linguis-tics, 2016. doi: 10.18653/v1/P16-1162. URL http://www.aclweb.org/anthology/P16-1162.

Shaw et al., Self-attention with relative position representations In Proceedings of the 2018 Conference of the North American Chapter of the Association for Computational Linguistics: Human Language Technologies, vol. 2 (Short Papers), pp. 464-468. Association for Computational Linguistics, 2018. doi: 10.18653/v1/N18-2074. URL http://aclweb.org/anthology/N18-2074.

Shen et al., Straight to the tree: Constituency parsing with neural syntactic distance. In Pro-ceedings of the 56th Annual Meeting of the Association for Computational Linguistics (vol. 1: Long Papers), pp. 1171-1180. Association for Computational Linguistics, 2018. URL http://aclweb.org/anthology/P18-1108.

Shen et al., Ordered neurons: Integrating tree structures into recurrent neural networks. In International Conference on Learning Repre-sentations, 2019. URL https://openreview.net/forum?id=B1l6qiR5F7.

Shi et al., On tree-based neural sentence modeling. CoRR, abs/1808.09644, 2018. URL http://arxiv.org/abs/1808.09644.

Socher et al., Recursive deep models for semantic compositionality over a sentiment treebank. In Proceedings of the 2013 Conference on Empirical Methods in Natural Language Processing, pp. 1631-1642. Association for Computational Linguistics, 2013. URL http://aclweb.org/anthology/D13-1170.

Strubell et al., Linguistically-informed self-attention for semantic role labeling. arXiv preprint arXiv:1804.08199, 2018.

Tai et al., Improved semantic representations from tree-structured long short-term memory networks. CoRR, abs/1503.00075, 2015. URL http://arxiv.org/abs/1503.00075.

Vaswani et al., Attention is all you need. In 31st Conference on Neural Information Processing Systems (NIPS 2017), Long Beach, CA, USA, Dec. 6, 2017, pp. 1-15, 2017.

Wang et al., Glue: A multi-task benchmark and analysis platform for natural language understanding. arXiv preprint arXiv:1804.07461, 2018.

Wu et al., Pay less attention with lightweight and dynamic convolutions. In International Conference on Learning Representations, 2019. URL https://openreview.net/forum?id=SkVhlh09tX.

Yang et al., XInet: Generalized autoregressive pretraining for language understanding. arXiv preprint arXiv:1906.08237, 2019.

* cited by examiner

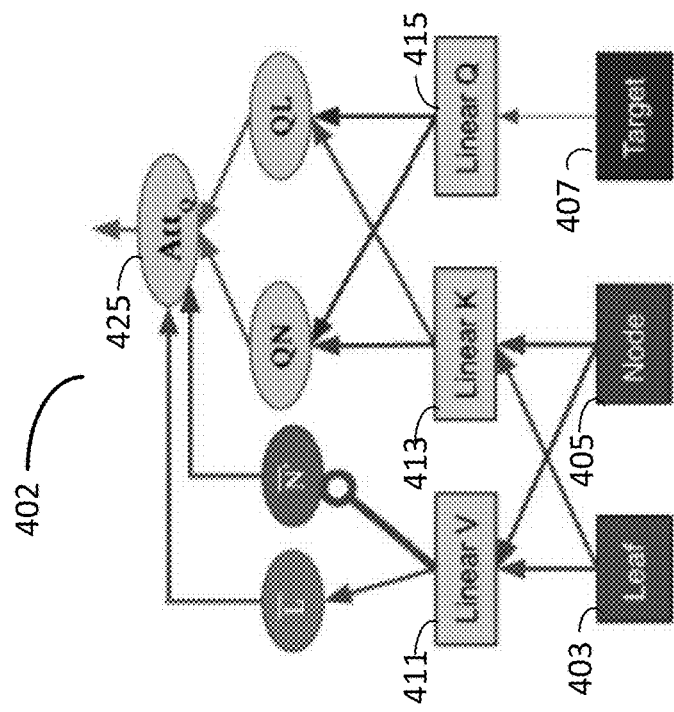
FIG. 4B Decoder Cross-attention
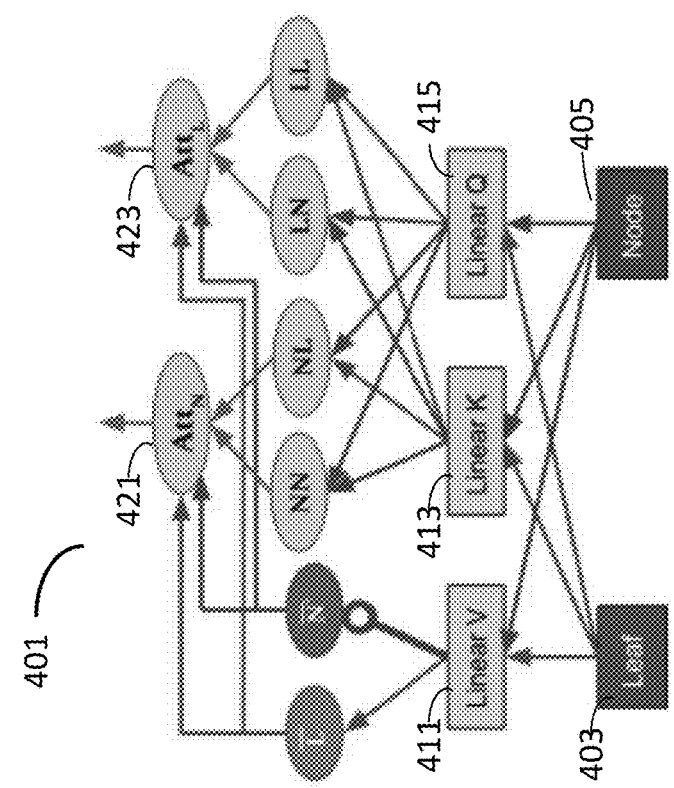
FIG. 4A Encoder Self-attention

| Model | En-De | En-Fr | De-En | Fr-En |
|---|---|---|---|---|
| Tree2Seq | 24.00 | | | |
| Transformer | 28.35 | 43.75 | 34.42 | 42.84 |
| Dynamic Conv | 28.43 | 43.72 | 34.72 | 42.40 |
| AffValue | 29.52 | 45.05 | 35.80 | 44.15 |
| -Value | 29.47 | 45.53 | 35.96 | 44.34 |

FIG. 7

| Task | Transformer | LSTM | Tree-Based Models | | |
|---|---|---|---|---|---|
| | | | Tree-LSTM | Ours | |
| SST-5 | 37.6 | 35.1 | 43.9 | 47.4 | |
| SST-2 | 74.8 | 76.0 | 82.0 | 84.3 | |
| SVA | 94.4 | 95.1 | 96.2 | 98.0 | |
| IMDB | 89.7 | 88.2 | – | 97.1 | |

FIG. 8A

| Model | En-De | En-Fr | SST |
|---|---|---|---|
| TreeTransformer | 29.47 | 45.53 | 47.3 |
| –HierEmb | 29.20 | 44.80 | 46.1 |
| –SubMask | 29.05 | 45.07 | 45.7 |
| –HierEmb –SubMask | 28.98 | 44.50 | 45.0 |

FIG. 8B

| Model | En-De | En-Fr | De-En | Fr-En |
|---|---|---|---|---|
| leaves/nodes | 59.2/40.8 | 59.3/40.7 | 66.4/33.6 | 64.7/35.3 |
| Target→Leaves | 33.6±2e−4 | 38.1±6e−4 | 35.1±4e−4 | 40.7±2e−2 |
| Target→Nodes | 66.4±2e−4 | 61.9±6e−4 | 64.9±4e−4 | 59.3±2e−2 |
FIG. 9
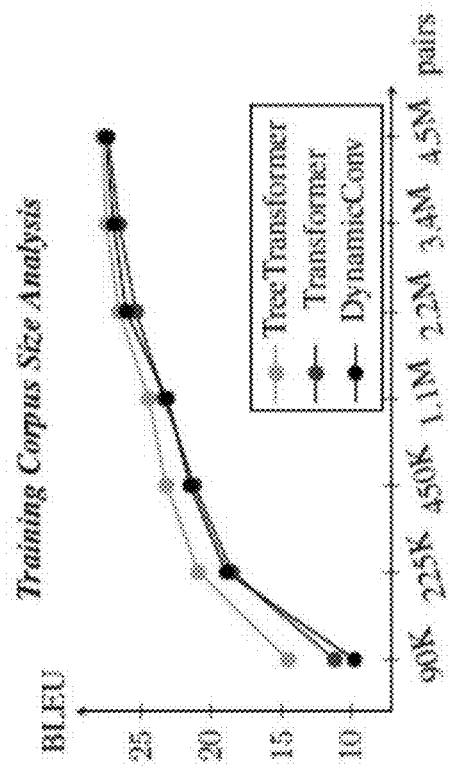
FIG. 10B
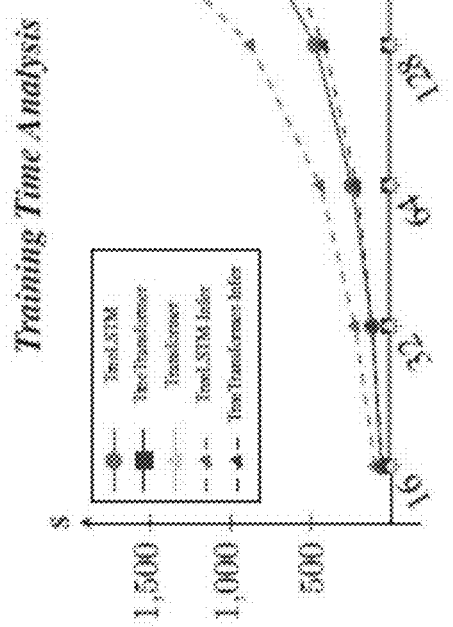
FIG. 10A

SYSTEMS AND METHODS FOR A TRANSFORMER NETWORK WITH TREE-BASED ATTENTION FOR NATURAL LANGUAGE PROCESSING

CROSS-REFERENCE(S)

The present disclosure claims priority under 35 U.S.C. 119 to U.S. Provisional Application No. 62/887,340, filed on Aug. 15, 2019, which is hereby expressly incorporated by reference herein in its entirety.

TECHNICAL FIELD

The present disclosure relates generally to training and use of machine learning systems and more specifically to a transformer network with tree-based attention for natural language processing.

BACKGROUND

Hierarchical structures have been used for various natural language processing (NLP) tasks. For example, parse trees can be used to represent the syntactic structure of a string of text, such as a natural language sentence, according to grammatical rules. The parse tree takes a form of an ordered, rooted tree having a number of nodes, each of which represents a verb, a noun, a phrase, and/or the like from the original sentence. The hierarchical structure such as the parse tree of an input sentence in natural language is then encoded into a vector representation for further performing text classification, neural machine translation, and/or other NLP tasks on the input sentence.

Incorporating hierarchical structures like constituency trees has been shown effective for various natural language processing (NLP) tasks. However, it is evident that state-of-the-art (SOTA) sequence-based models like the Transformers struggle to encode such structures inherently. On the other hand, dedicated models like Tree long short-term memory (LSTM), which explicitly models parse structures, do not perform as efficiently as the transformer framework.

BRIEF DESCRIPTION OF THE DRAWINGS

FIG. 4A is a simplified diagram illustrating a transformer framework structure integrating the hierarchical accumulation described in FIGS. 1A-3B for encoder self-attention, according to some embodiments.

FIG. 4B is a simplified diagram illustrating a transformer framework structure integrating the hierarchical accumulation described in FIGS. 1A-3B for decoder cross-attention, according to some embodiments.

FIG. 7 is an example table illustrating example neural machine translation results using the hierarchical accumulation process described in FIGS. 1A-6, according to some embodiments.

FIGS. 8A-8B are example tables illustrating example text classification results using the hierarchical accumulation process described in FIGS. 1A-6, according to some embodiments.

FIG. 9 is an example table illustrating example attention distributions (%) between phrases (nodes) and tokens (leaves) across language pairs using the hierarchical accumulation process, according to some embodiments.

FIGS. 10A-10B provide example data plots illustrating training time and training data size analysis for the hierarchical accumulation process, according to some embodiments.

Figure 1A:
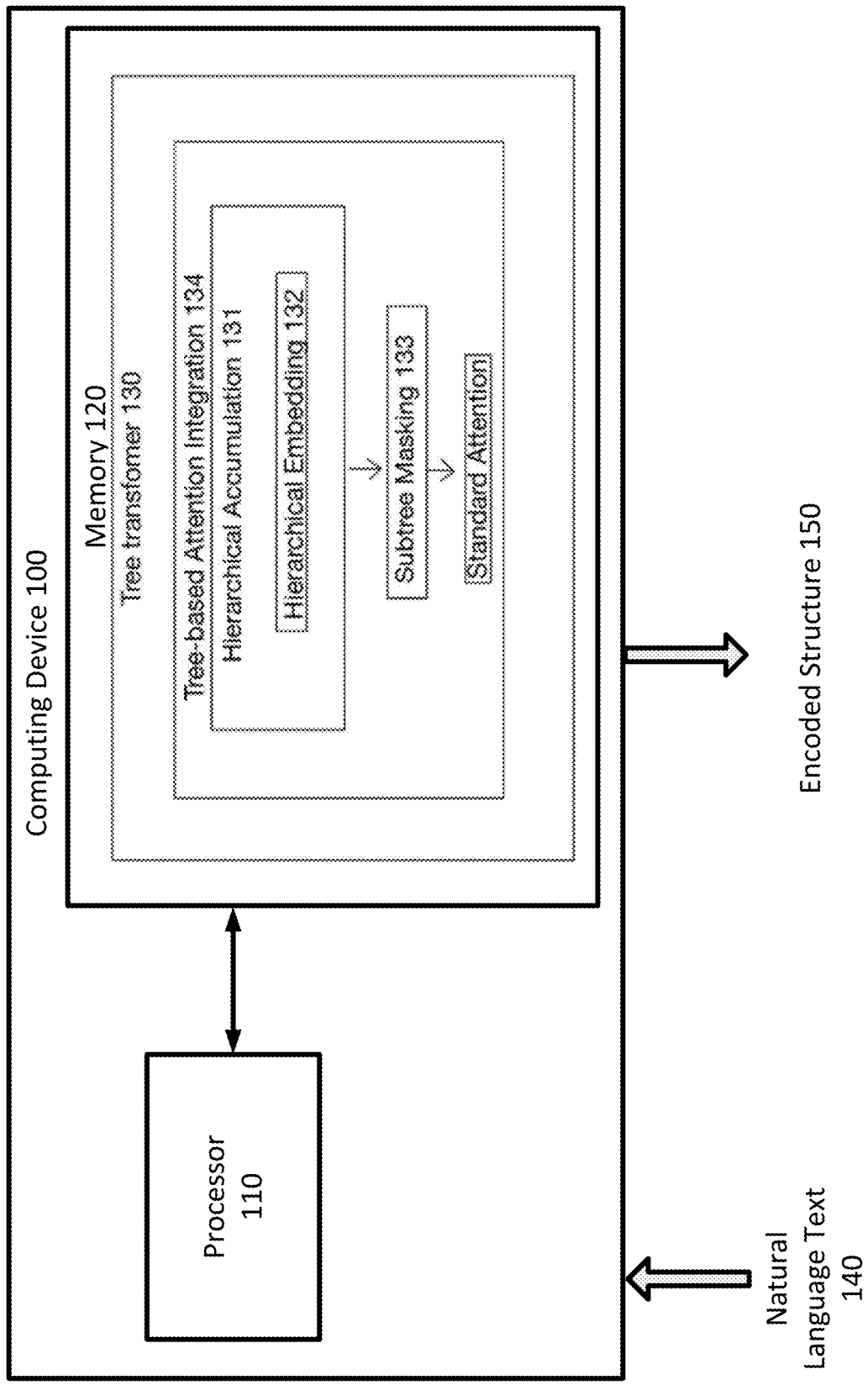
FIGS. 1A-1B are alternative configuration of a simplified computing device implementing a tree transformer system, according to some embodiments.

In the figures, elements having the same designations have the same or similar functions.

DETAILED DESCRIPTION

In view of the need for an efficient encoder or decoder for hierarchical structures, embodiments described herein provide an attention-based mechanism that encodes trees in a bottom-up manner and executes competitively with the transformer framework at constant parallel time complexity. Specifically, the attention layer receives as input the pre-parsed constituency tree of a sentence and then models the hidden states of all nodes in the tree (leaves and nonterminal nodes) from their lower-layer representations following the tree structure. As attentions typically have a query, key and value components, hierarchical accumulation is used to encode the value component of each nonterminal node by aggregating the hidden states of all of its descendants.

In some embodiments, the accumulation process is three-staged. First, the value states of non-terminal nodes are implemented with hierarchical embeddings, which help the model aware of the hierarchical and sibling relationships among nodes. Second, upward cumulative-average operation on each target node, which accumulates all elements in the branches originating from the target node to its descendant leaves. Third, these branch-level representations are combined into a new value representation of the target node by using weighted aggregation. Finally, the model proceeds to perform attention with subtree masking where the attention score between a non-terminal query and a key is only activated if the key is a descendant of the query.

In this way, by encoding trees in a bottom-up manner, the proposed model can leverage attention mechanism to achieve high efficiency and performance and is applicable to self-attention and encoder-decoder attention in the Transformer sequence-to-sequence skeleton. Thus, the proposed model can process all nodes of the tree hierarchically and work with multi-sentence documents (multi-tree) seamlessly.

Introduction: Transformer Framework

A transformer network is a sequence-to-sequence network that models sequential information using stacked self- and cross-attention layers. The output O of each attention sublayer is computed via scaled multiplicative formulations defined as:

$$A = \frac{(QW^Q)(KW^K)^T}{\sqrt{d}}; Att(Q, K, V) = S(A)(VW^V) \quad (1)$$

$$O = Att(Q, K, V)W^O \quad (2)$$

where S is the softmax function, $Q=(q_1, \ldots, q_{lq}) \in \mathbb{R}^{lq \times d}$, $K=(k_1, \ldots, k_{lk}) \in \mathbb{R}^{lk \times d}$, $V=(V_1, \ldots, V_{lk}) \in \mathbb{R}^{lk \times d}$ are matrices of query, key and value vectors respectively, and $W^Q$, $W^K$, $W^V$, $W^O \in \mathbb{R}^{d \times d}$ are the associated trainable weight matrices. A denotes the affinity scores attention scores) between queries and keys, while Att(Q, K, V) are the attention vectors. Then, the final output of a Transformer layer is computed as:

$$\emptyset(A,Q)=LN(FFN(LN(O+Q))+LN(O+Q)) \quad (3)$$

where Ø represents the typical serial computations of a Transformer layer with layer normalization (LN) and feed-forward (FFN) layers.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Tree-Based Attention

Figure 1B:
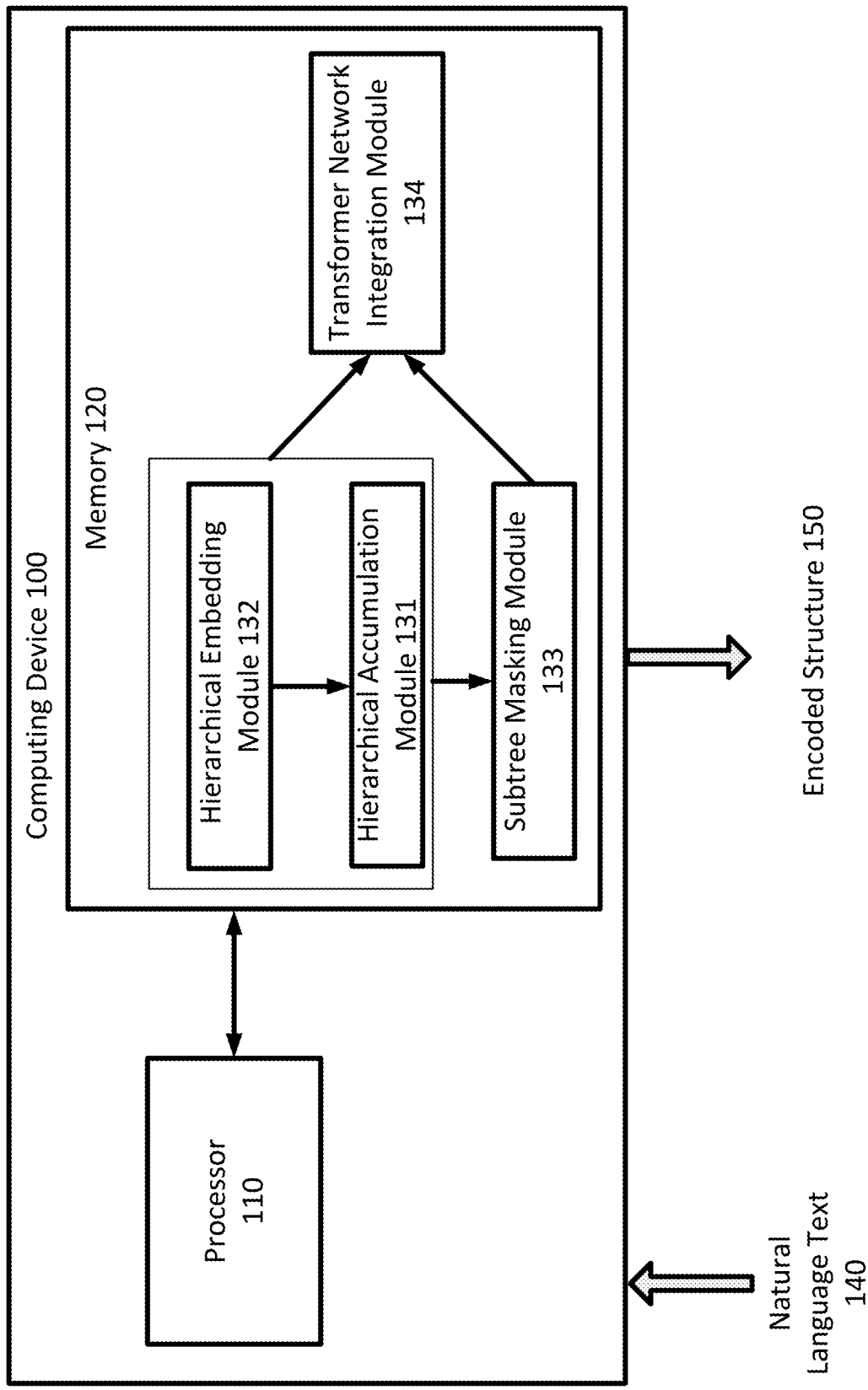

FIGS. 1A-1B are simplified diagrams of alternative configurations of a computing device 100 for implementing a tree transformer system according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a tree transformer module 130 that may be used to implement and/or emulate the systems and models, and/or to implement any of the methods described further herein. In some examples, the tree transformer module 130 may be used to receive and handle the input of a natural language sentence 140. In some examples, the tree transformer module 130 may also handle the iterative training and/or evaluation of a system or model used for natural language processing tasks.

In some embodiments, as shown in FIG. 1A, the tree transformer module 130 includes a hierarchical accumulation module 131, a hierarchical embedding module 132, a subtree masking module 133, and a standard attention module, which are all encapsulated in a tree-based attention integration module 134. For example, the hierarchical embedding module 132 may be embedded inside the hierarchical accumulation module 131, which generates the output tensor S representation. For another example, in the transformer network integration module 134, the outputs from the hierarchical accumulation module 131, which may include the hierarchical embedding module 132, are passed to the subtree masking module 133, followed by attention mechanism to generate the final representation of the encoded structure 150 corresponding to the natural language text input 140. In some examples, the tree transformer module 130 and the sub-modules 131-134 may be implemented using hardware, software, and/or a combination of hardware and software.

In another embodiment, as shown in FIG. 1B, the hierarchical embedding module 132 may be connected to the hierarchical accumulation module 131, both of which are encapsulated to generate an output to the subtree masking module 133. The outputs from the encapsulation of the hierarchical accumulation module 131 and the hierarchical embedding module 132 and the output from the subtree masking module 133 may be integrated at the transformer network integration module 134 to generate the final representation of the encoded structure 150 corresponding to the natural language text input 140.

As shown, computing device 100 receives input such as a natural language sentence 140, denoted by X, which is provided to the tree transformer module 130. The tree transformer module 130 may preliminarily generate a pre-parsed constituency tree $\mathcal{T}$ (X) corresponding to the natural language sentence X. The tree transformer module 130 may then operate on the pre-parsed constituency tree $\mathcal{T}$ (X) via the sub-modules 131-134 to generate an output of a representation of an encoded structure 150 corresponding to the pre-parsed constituency tree $\mathcal{T}$ (X).

In some embodiments, the hierarchical accumulation module 131 is configured to encode pre-parsed constituency tree $\mathcal{T}$ (X) in a bottom-up manner. Specifically, an interpolation function is used to generate a tensor output S, which is then induced with the tree structure in a bottom-up manner by an upward cumulative-average operation. A node representation can be computed based on the generated tensor output S. Further discussion of the hierarchical accumulation process is provided in relation to FIGS. 2A-2B.

In some embodiments, the hierarchical embedding module 132 is configured to induce distinguishable tree forms into the interpolated tensor S before being accumulated. Specifically, a hierarchical embedding tensor E is interpolated, which is then element-wise added to the interpolated tensor S before the accumulation process. Further discussion of the hierarchical embedding process is provided in relation to FIGS. 3A-3B.

In some embodiments, the subtree masking module 133 is configured to introduce subtree masking for encoder self-attention. Specifically, in the pre-parsed constituency tree $\mathcal{T}$ (X), attentions are only turned on only for affinity pairs whose keys belong to the subtree of which a specific node-query is the root. In other words, each node-query only has access to elements its own subtree (or descendants), but not its ancestors and siblings. Further discussion of the subtree masking process is provided in relation to FIG. 6.

In some embodiments, the transformer network integration module 134 is configured to integrate the processes with sub-modules 131-133 into self- and cross-attentions of the transformer framework. Further discussions of the transformer integration are provided in relation to FIGS. 4A-5B.

Figure 1C:
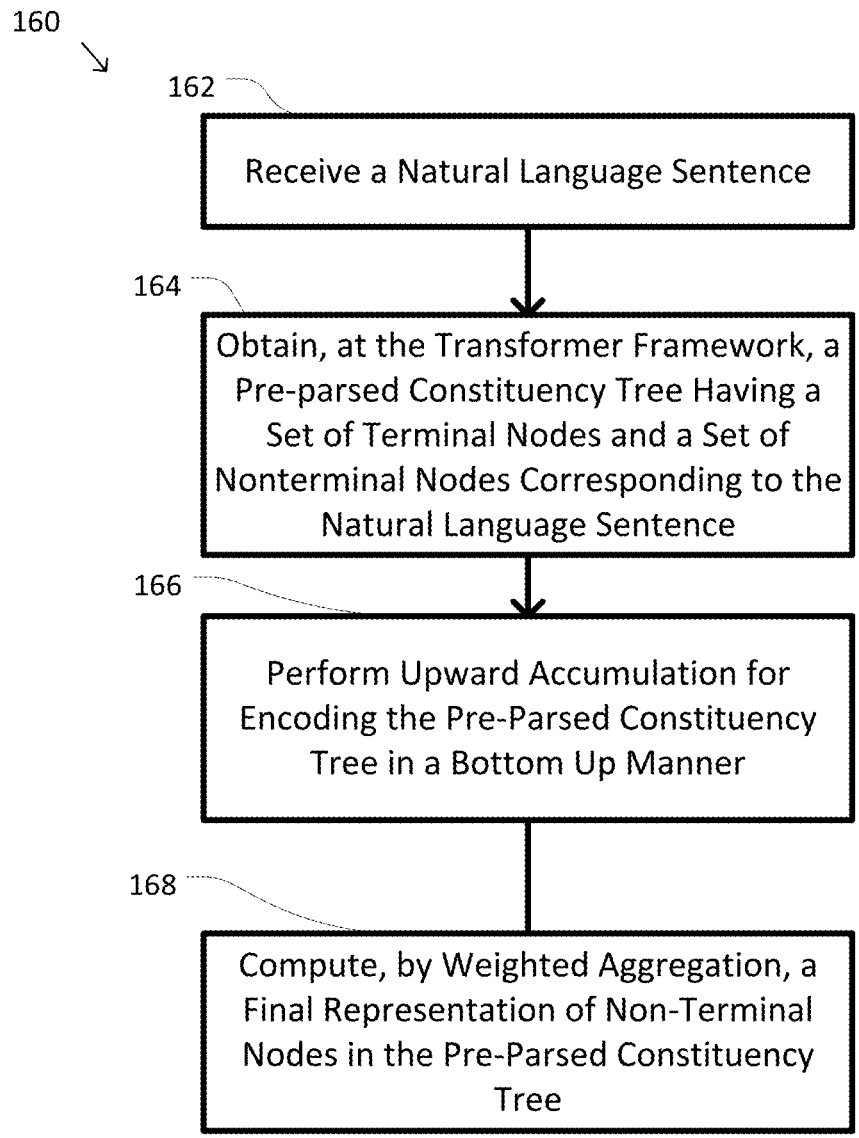
FIG. 1C provides an example logic flow diagram illustrating an example method for encoding an input sentence using the tree-based attention transformer system described in FIGS. 1A-1B, according to some embodiments.

FIG. 1C provides an example logic flow diagram illustrating an example method 160 for encoding an input sentence using the tree-based attention transformer system described in FIGS. 1A-1B, according to some embodiments. At step 162, a natural language sentence X is received, e.g., the natural language text 140 received at a communication or user interface of computing device 100.

At step 164, a pre-parsed constituency tree $\mathcal{T}$ (X) having a set of terminal nodes and a set of nonterminal nodes corresponding to the natural language sentence is obtained, e.g., via a parser. For example, the pre-parse constituency tree is provided to the tree transformer 130 in FIG. 1A.

Figure 2A:
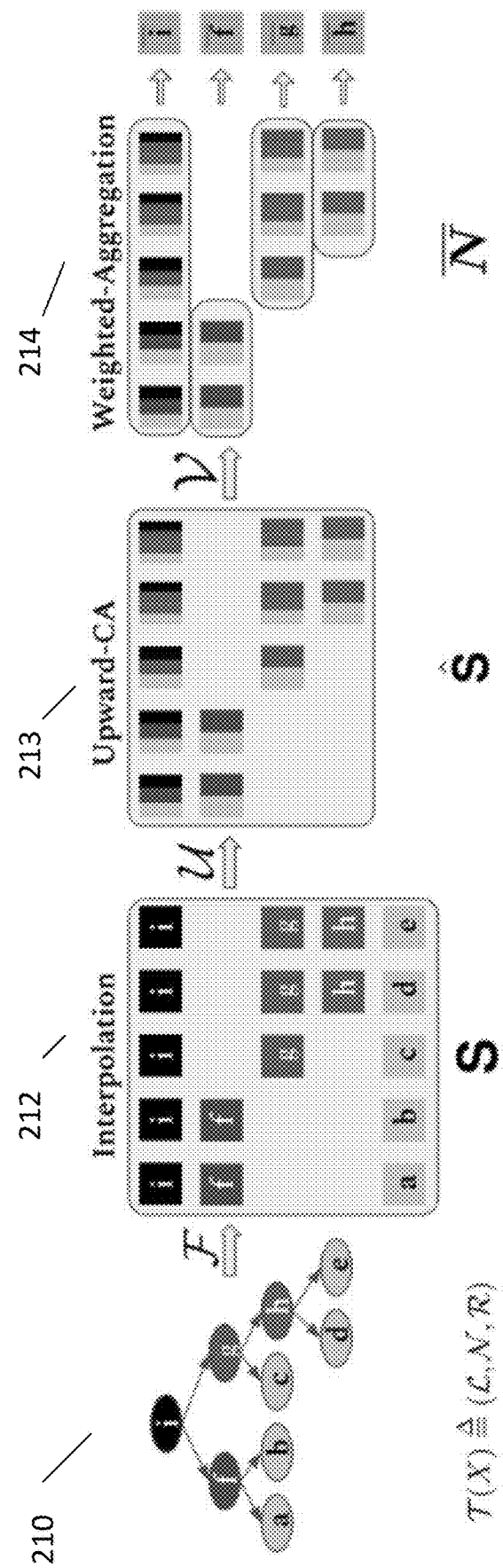
FIG. 2A is a simplified diagram illustrating a process implemented by the hierarchical accumulation module described in FIGS. 1A-1B, according to some embodiments.
Figure 2B:
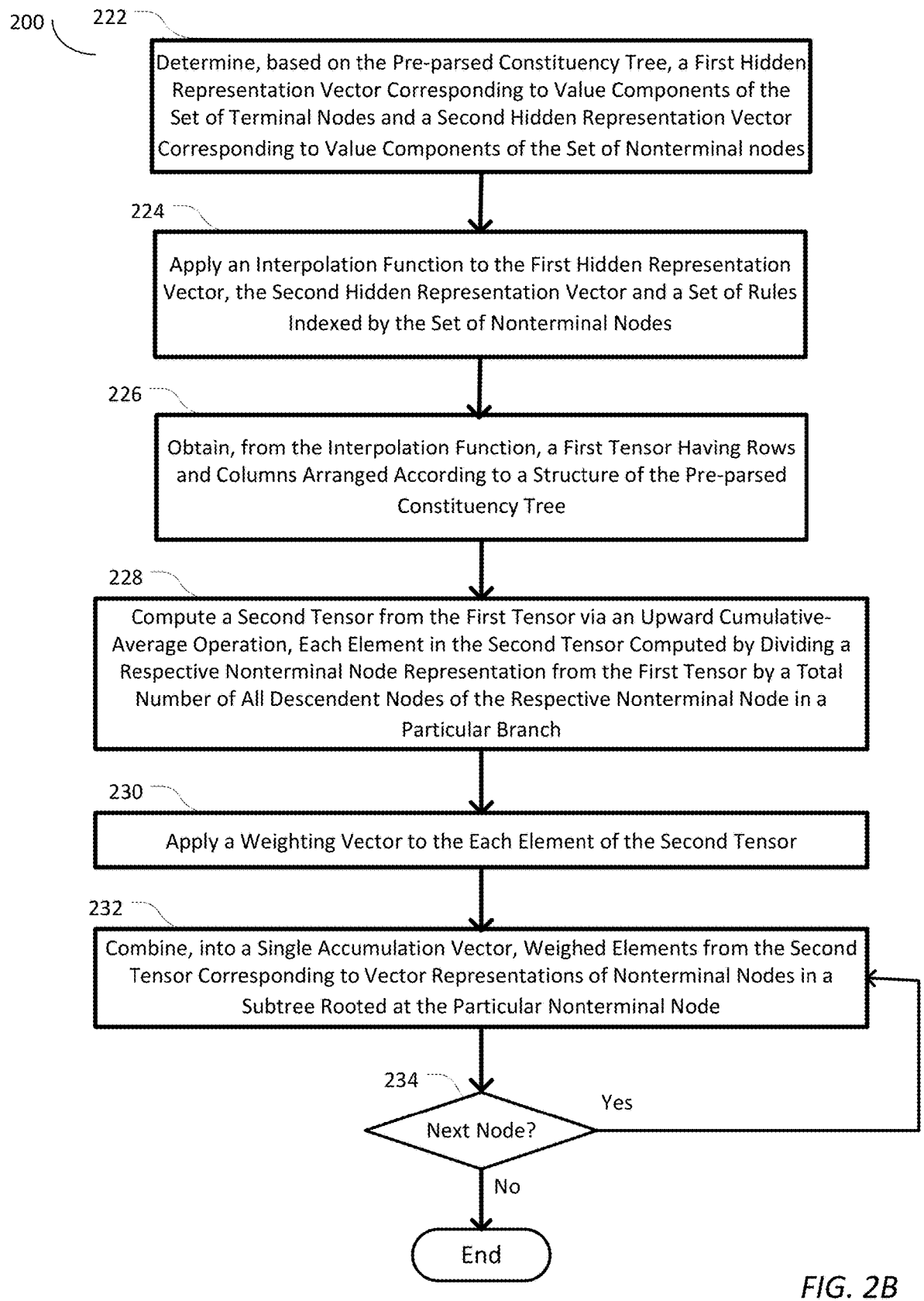
FIG. 2B is an example logic flow illustrating an example method for performing the hierarchical accumulation process illustrated in FIG. 2A, according to some embodiments.

At step 166, the hierarchical accumulation module 131 encodes a respective value component of each nonterminal node from the pre-parsed constituency tree by aggregating hidden states of descendant nodes of the respective nonterminal node via upward accumulation in a bottom-up manner, as further discussed in relation to FIGS. 2A-2B.

At step 168, the hierarchical accumulation module 131 computes, by weighted aggregation, a final representation of the set of nonterminal nodes in the pre-parsed constituency tree based on the encoding.

FIG. 2A is a simplified diagram illustrating a process implemented by the hierarchical accumulation module described in FIGS. 1A-1B, and FIG. 2B is an example logic flow illustrating an example method 200 for performing the hierarchical accumulation process illustrated in FIG. 2A, according to some embodiments according to some embodiments. To encode hierarchical structures in parallel, the tree $\mathcal{T}$ (X) is generated in a data structure that can be parallelized at process 210. For example, given a sentence X of length n, let $\mathcal{G}$ (X) be the directed spanning tree which represents the parse tree of X produced by the parser. Transformation $\mathcal{H}$ is defined such that $\mathcal{H}(\mathcal{G}(X))=\mathcal{T}(X) \triangleq (\mathcal{L}, \mathcal{N}, \mathcal{R})$. In this formulation, $\mathcal{L}$ denotes the ordered sequence of n terminal nodes (or leaves) of the tree (i.e., $\mathcal{L}$ =X), and $\mathcal{N}$ denotes the sequence of m nonterminal nodes (or simply nodes), each of which has a phrase label (e.g., NP, VP) and spans over a sequence of terminal nodes. $\mathcal{R}$ contains a set of rules indexed by the nonterminal nodes in $\mathcal{N}$ such that for each node $x \in \mathcal{N}$, $\mathcal{R}$ (x) denotes the set of all nodes that belong to the subtree rooted at x. For example, for the nonterminal g and h at process 210, $\mathcal{R}$ (g)={g, c, h, d, e} and $\mathcal{R}$ (h)={h, d, e}.

In various embodiments, there may be various ways to transform the tree $\mathcal{G}$ (X). For a tree-encoding process, a particular transformation is legitimate only if the resulting data structure represents only $\mathcal{G}$ (X) and not any other structures. Otherwise, the encoding process may confuse $\mathcal{G}$ (X) with another structure. In other words, the transformation should be a one-to-one mapping. The defined transformation $\mathcal{H}$ satisfies this requirement as shown in the following proposition:

Proposition 1 Suppose $\mathcal{G}$ (X) is a parse tree and there exists a transformation $\mathcal{H}^{-1}$ that converts $\mathcal{T}$ (X) to a graph $\mathcal{H}^{-1}(\mathcal{T}(X))$, then $\mathcal{H}^{-1}$ can only transform $\mathcal{T}$ (X) back to $\mathcal{G}$ (X), or:

$$\mathcal{H}^{-1}(\mathcal{H}(\mathcal{G}(X)))=\mathcal{G}(X) \qquad (4)$$

After generating the tree structure $\mathcal{T}$ (X) at process 210, tree accumulation can be performed using $\mathcal{T}$ (X). For example, as shown at step 222 of method 200 in FIG. 2B, a first hidden representation vector corresponding to value components of the set of terminal nodes and a second hidden representation vector corresponding to value components of the set of nonterminal nodes is determined based on the pre-parsed constituency tree $\mathcal{T}$ (X). Specifically, let $L=(l_1, \ldots l_n) \in \mathbb{R}^{n \times d}$, and $N=(n_1, \ldots n_m) \in \mathbb{R}^{m \times d}$ be the hidden representations of leaves $\mathcal{L} =(x_1^\mathcal{L}, \ldots, x_m^\mathcal{N})$ respectively.

At step 224, an interpolation function is applied to the first hidden representation vector, the second hidden representation vector and a set of rules indexed by the set of nonterminal nodes. Specifically, an interpolation function $\mathcal{F}: (\mathbb{R}^{n \times d}, \mathbb{R}^{m \times d}) \to \mathbb{R}^{(m+1) \times n \times d}$, which takes $\mathcal{L}$, $\mathcal{N}$, $\mathcal{R}$ as inputs and returns a tensor $S \in \mathbb{R}^{(m+1) \times n \times d}$.

At step 226, a first tensor is obtained from the interpolation function. The tensor S has rows and columns arranged according to a structure of the pre-parsed constituency tree. Specifically, the row i and column j vector of tensor S, or $S_{i,j} \in \mathbb{R}^d$, is defined as:

$$S_{i,j} = \mathcal{F}(L, N, \mathcal{R})_{i,j} = \begin{cases} l_j & \text{if } i = 1 \\ n_{i-1} & \text{else if } x_j^\mathcal{L} \in \mathcal{R}(x_{i-1}^\mathcal{N}) \\ 0 & \text{otherwise} \end{cases} \qquad (5)$$

where 0 denotes a zero vector of length k. Here the row and column arrangements in S reflect the tree structure, as shown by the mapping between the nodes in the tree at 210 and the blocks in the tensor S shown at block 212.

At step 228, a second tensor is computed from the first tensor via an upward cumulative-average operation $\mathcal{U}$ which is applied on tensor S to compose the node representations in a bottom-up fashion over the induced tree structure. The result of this operation is a tensor $\hat{S} \in \mathbb{R}^{m \times n \times d}$ as shown at block 213. Each element in the second tensor $\hat{S}$ is computed by dividing a respective nonterminal node representation from the first tensor by a total number of all descendent nodes of the respective nonterminal node in a particular branch Specifically, the operation $\mathcal{U}$ is defined as:

$$\mathcal{U}(S)_{i,j} = \hat{S}_{i,j} = \begin{cases} 0 & \text{if } S_{i+1,j} = 0 \\ \sum_{s_{t,j} \in C_j^i} S_{t,j}/|C_j^i| & \text{otherwise} \end{cases} \quad (6)$$

where $C_j^i = \{S_{1,j}\} \cup \{S_{t,j} | x_t^N \in \mathcal{R}(x_i^N)\}$ is the set of vectors in S representing the leaves and nodes in the branch that starts at node $x_i^N$ and ends with node $x_i^L$. Here the leaves are discarded in tensor $\hat{S}$. As demonstrated at process 213, each row i of tensor $\hat{S}$ represents a nonterminal node $x_i^N$ and each entry $S_{i,j}$ represents its vector representation reflecting the tree branch from $x_i^N$ to a leaf $x_i^L$. This gives $|\mathcal{R}(x_i^N) \cap \mathcal{L}|$ different constituents of $x_i^N$ that represent branches rooted at $x_i^N$.

Block 214 shows a combination of the branch-level accumulated representations of a nonterminal node $x_i^N$ into a single vector $\overline{n}_i$, that encapsulates all the elements in the subtree rooted by $x_i^N$, which is done via a weighted aggregation operation. Specifically, at step 230 in FIG. 2B, a weighting vector is applied to each element of the second tensor $\hat{S}$. At step 232, for a particular nonterminal node from the set of nonterminal nodes, weighed elements from the second tensor $\hat{S}$ corresponding to vector representations of nonterminal nodes in a subtree rooted at the particular nonterminal node are combined, into a single accumulation vector.

The aggregation function $\mathcal{V}$ takes tensor $\hat{S}$ as input and a weighting vector $w \in \mathbb{R}^n$, and computes the final node representations $\overline{N} = (\overline{n}_1, \ldots, \overline{n}_m) \in \mathbb{R}^{m \times d}$, where each row-vector $\overline{n}_t$ in $\overline{N}$ is computed as:

$$\mathcal{V}(\hat{S}, w)_i = \overline{n}_i = \frac{1}{|\mathcal{L} \cap \mathcal{R}(x_i^N)|} \sum_{j : x_j^L \in \mathcal{R}(x_i^N)} w_j \odot \hat{S}_{i,j} \quad (7)$$

where $\odot$ denotes the element-wise multiplication. Specifically, the aggregation function $\mathcal{V}$ computes a weighted average of the branch-level representations. In summary, the hierarchical accumulation process can be expressed as the following equation:

$$\overline{N} = \mathcal{V}(\mathcal{U}(S), w) = \mathcal{V}(\mathcal{U}(\mathcal{F}(\mathcal{L}, \mathcal{N}, \mathcal{R}), w) \quad (8)$$

At step 234, the method 200 may repeat until every nonterminal node has been processed and a final node representation $\overline{n}_i$ is generated for the vector $\overline{N}$. While the method 200 models the states of nonterminal nodes as an encapsulation of their respective descendants, those descendants are equally represented since no biases are imposed on them. In other words, although each branch from a node comprises a distinctive set of descendants, the hierarchy of elements within a branch and the sibling relationship among branches are not explicitly represented. Thus, it may be beneficial to introduce biases that reflect such underlying subtree-level hierarchical structures, e.g., by applying hierarchical embedding to the tensor S before elements of S is accumulated through an upward cumulative-average operation.

Figure 3A:
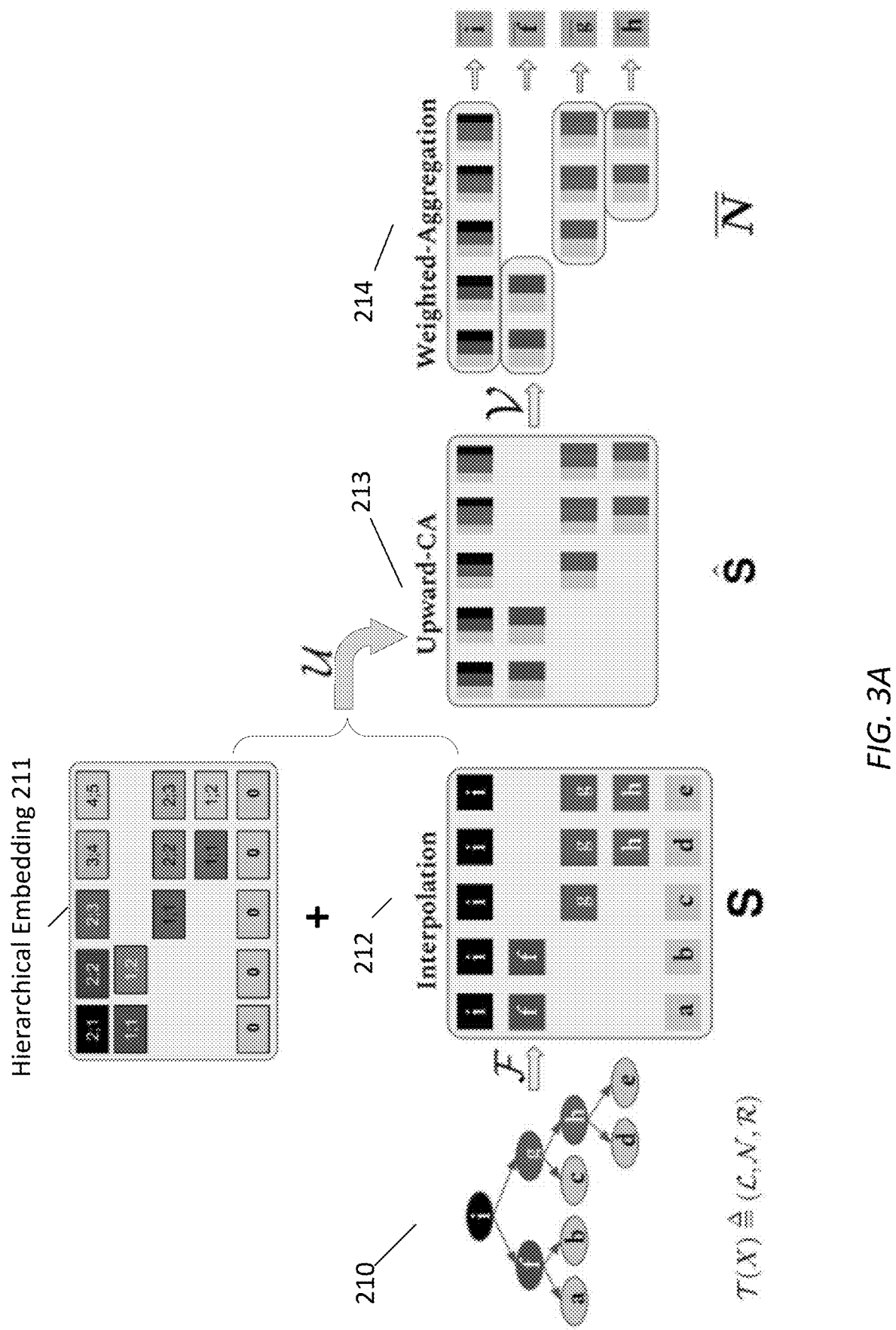
FIG. 3A is a simplified diagram illustrating a process implemented by the hierarchical embedding module described in FIGS. 1A-1B, according to some embodiments.
Figure 3B:
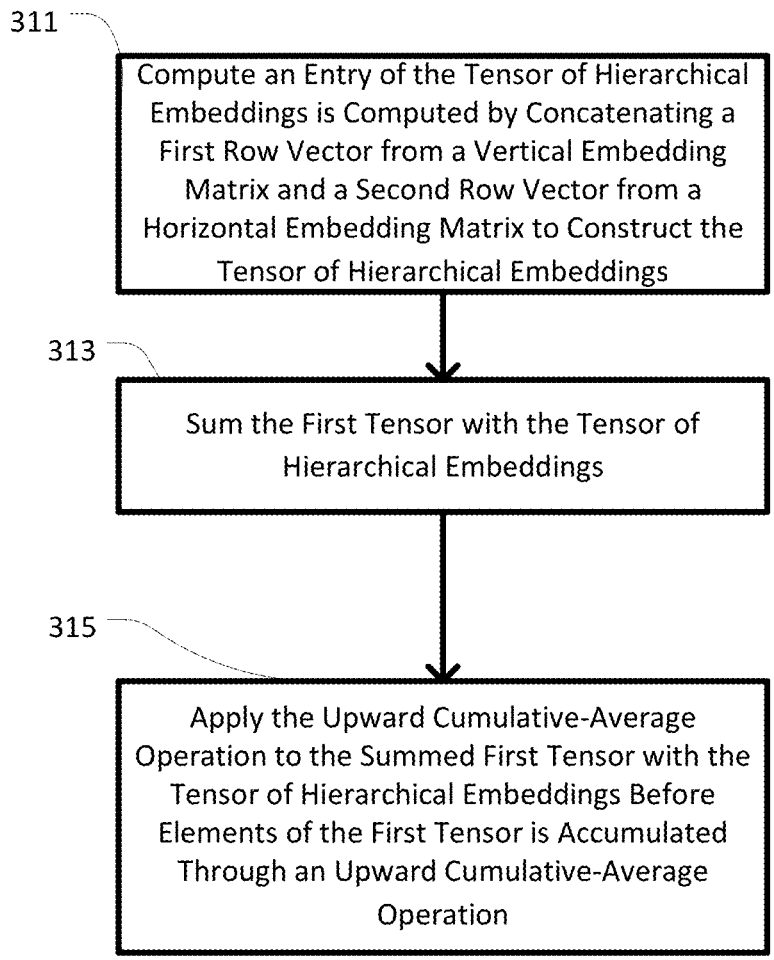
FIG. 3B is an example logic flow illustrating an example method for performing the hierarchical embedding process illustrated in FIG. 3A, according to some embodiments.

FIG. 3A is a simplified diagram illustrating a process implemented by the hierarchical embedding module described in FIGS. 1A-1B, and FIG. 3B is an example logic flow illustrating an example method for performing the hierarchical embedding process illustrated in FIG. 3A, according to some embodiments. Hierarchical embeddings are introduced to induce distinguishable tree structures into the tensor S before being accumulated by $\mathcal{U}$ and $\mathcal{V}$.

At step 311, a tensor of hierarchical embeddings is constructed, each entry of which is computed by concatenating a first-row vector from a vertical embedding matrix and a second-row vector from a horizontal embedding matrix. For example, given $\mathcal{L}, \mathcal{N}, \mathcal{R}$, a tensor of hierarchical embeddings $E \in \mathbb{R}^{(m+1) \times n \times d}$ with entries defined as follows:

$$E_{i,j} = \begin{cases} \left[ e_{|V_j^i|}^v ; e_{|H_j^i|}^h \right] & \text{if } i \geq 1 \text{ and } x_j^L \in \mathcal{R}(x_i^N) \\ 0 & \text{otherwise} \end{cases} \quad (9)$$

where $V_j^i = \{x_t^N | x_t^N \in \mathcal{R}(x_i^N) \text{ and } x_j^L \in \mathcal{R}(x_t^N)\}$ is the set of $x_j^L$'s ancestors up to $x_i^N$, and $H_j^i = \{x_t^L | t \leq j \text{ and } x_t^L \in \mathcal{L} \cap \mathcal{R}(x_i^N)\}$ is the set of leaves from the leftmost leaf up to $x_j^L$ of the $x_i^N$-rooted subtree; $e_i^v$ and $e_i^h$ are embedding row-vectors of the respective trainable vertical and horizontal embedding matrices $E^v, E^h \in \mathbb{R}^{E \times d/2}$ and $[\bullet; \bullet]$ denotes the concatenation operation in the hidden dimension. The vertical embeddings represent the path length of a node to a leaf which expresses the hierarchical order within a branch, whereas the horizontal embeddings exhibit the relationship among branch siblings in a subtree.

At step 313, tensor S (from block 212 in FIG. 3A) is summed with the tensor of hierarchical embeddings E. At step 315, the upward cumulative-average operation $\mathcal{U}$ is then applied to the summed tensor S with the tensor E of hierarchical embeddings. Thus, the resulting node representations after hierarchical encoding through blocks 213-214 in FIG. 3A are defined as:

$$\overline{N} = \mathcal{V}(\mathcal{U}_{(S+E)}, w) \quad (10)$$

For example, the embeddings can be shared across attention heads, making them account for only 0.25% of the total parameters.

Figure 5A:
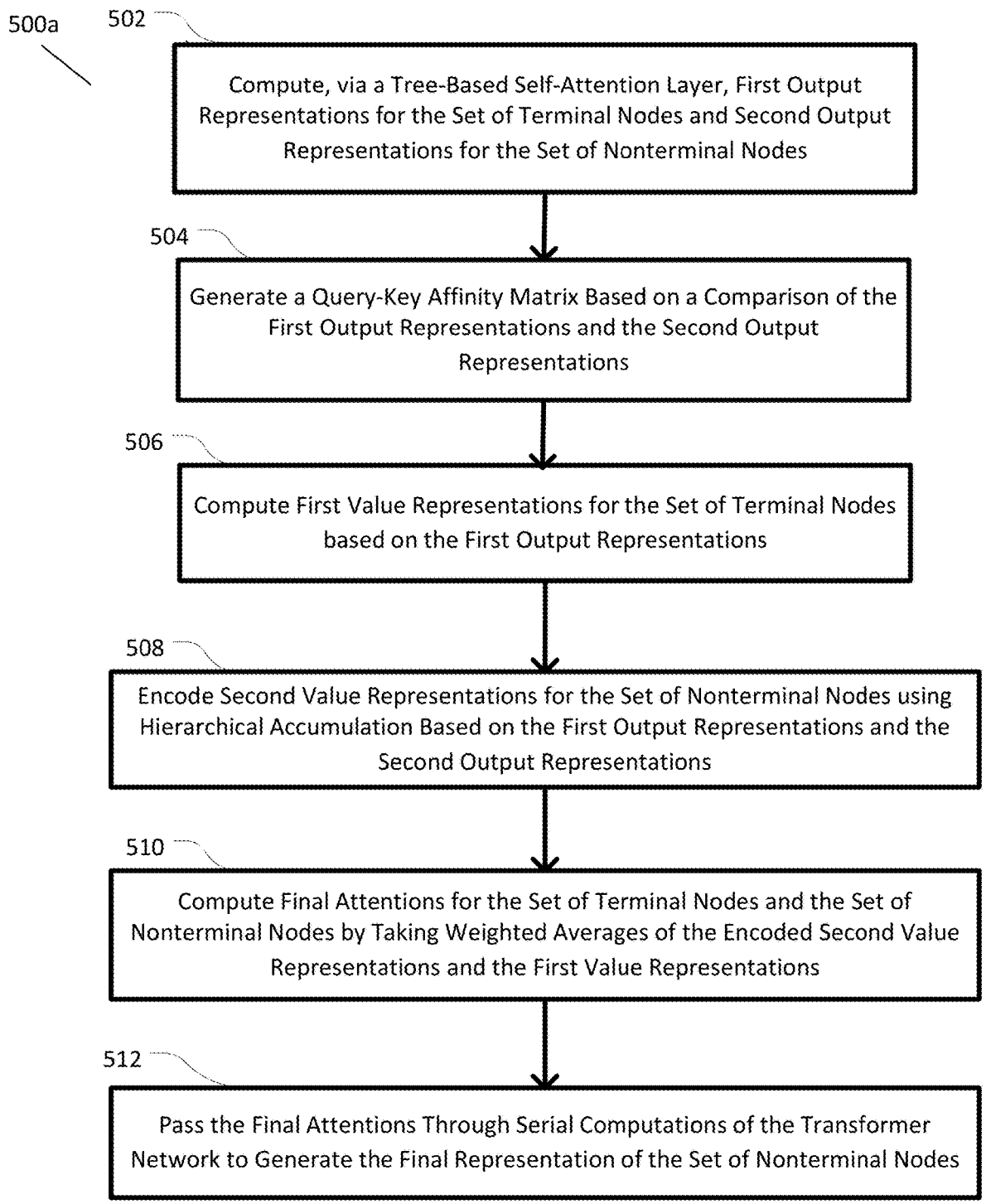
FIG. 5A is an example logic flow illustrating an example method for performing the encoder self-attention described in FIG. 4A, according to some embodiments.

FIG. 4A is a simplified diagram illustrating a transformer framework structure integrating the hierarchical accumulation described in FIGS. 1A-3B for encoder self-attention, and FIG. 5A is an example logic flow illustrating an example method 500a for performing the encoder self-attention described in FIG. 4A, according to some embodiments. In FIG. 4A, network 401 illustrates an example structure for encoder self-attention. Here, without loss of generality, let $L \in \mathbb{R}^{n \times d}$ and $N \in \mathbb{R}^{m \times d}$ respectively denotes the leaf and node representations that a Transformer encoder layer receives from its previous layer along with the input tree represented as $\mathcal{T}(X) = (\mathcal{L}, \mathcal{N}, \mathcal{R})$. For example, as shown in FIG. 4A, block 403 denotes the leaf representations and block 405 represents the (non-leaf) node representations.

As shown in FIG. 5A, at step 502, output representations for the set of terminal nodes (leaves) and output representations for the set of nonterminal nodes are computed, via a tree-based self-attention layer. Specifically, the tree-based self-attention layer (e.g., layer 413, 415 in FIG. 4A) then computes the respective output representations $\hat{L}$ and $\hat{N}$. At step 504, a query-key affinity matrix is generated based on a comparison of the node and leaf representations against each other. For example, the query-key affinity matrices $A_{NL} \in \mathbb{R}^{m \times n}$, $A_{NN} \in \mathbb{R}^{m \times m}$, $A_{LL} \in \mathbb{R}^{n \times n}$ and $A_{LN} \in \mathbb{R}^{n \times m}$ for node-leaf (i.e., node representation as the query and leaf representation as the key), node-node, leaf-leaf, and leaf-node pairs, respectively, as follows:

$$A_{NL} = (NW^Q)(LW^K)^T/\sqrt{d} \quad (11)$$

$$A_{LL} = (LW^Q)(LW^K)^T/\sqrt{d} \quad (12)$$

$$A_{NN} = (NW^Q)(NW^K)^T/\sqrt{d} \quad (13)$$

$$A_{LN} = (LW^Q)(NW^K)^T/\sqrt{d} \quad (14)$$

At step 506, value representations for the set of terminal nodes (leaves) are computed based on the output representations of the terminal nodes. Specifically, the value representation $\bar{L}$ of the leaves L is computed by a linear layer (e.g., linear layer 411 in FIG. 4A). At step 508, value representations for the set of nonterminal nodes are encoded using hierarchical accumulation based on output representations of the nonterminal nodes and the terminal nodes. For example, representation $\bar{N}$ of the nodes N is encoded with tree structure using hierarchical accumulation process as:

$$\bar{N} = \mathcal{V}(\mathcal{U}(\mathcal{F}_{(LW^V, NW^V, \mathcal{R})} + E), w); \bar{L} = LW^V \quad (15)$$

where $w = Lu_s$ with $u_s \in \mathbb{R}^d$ being a trainable vector. The resulting affinity scores for leaves and nodes are concatenated and then masked by subtree masking to promote bottom-up encoding, as further illustrated in relation to block 608 in FIG. 6.

Figure 6:
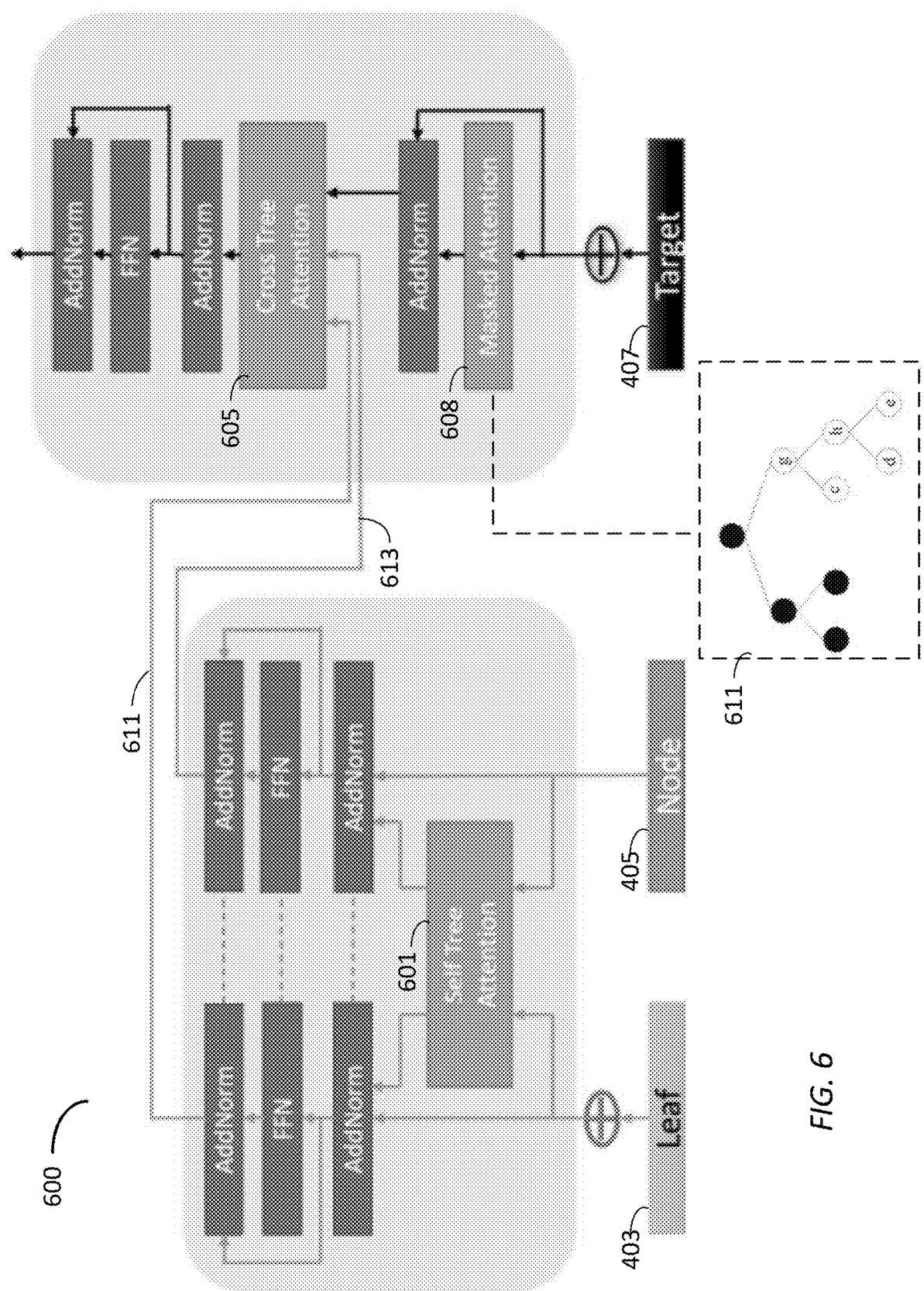
FIG. 6 is a simplified diagram illustrating an example architecture of a tree transformer for implementing the hierarchical accumulation process, according to embodiments described herein.

At step 510, final attentions (e.g., output 421, 423 in FIG. 4A) for the set of terminal nodes and the set of nonterminal nodes are computed by taking weighted averages of the encoded value representations $\bar{N}'$ and the value representations $\bar{L}$:

$$Att_N = S(\mu([A_{NN}; A_{NL}]))[\bar{N}'; \bar{L}] \quad (16)$$

$$Att_L = S(\mu([A_{LN}; A_{LL}]))[\bar{N}'; \bar{L}] \quad (17)$$

where $\mu(\ )$ is the subtree masking function discussed in relation to FIG. 6.

At step 512, both attentions $Att_N$ (421) and $Att_L$ (423) are then passed through the Transformer's serial computations by function $\varphi$, which results in the final output representations $\bar{N}$ and $\bar{L}$ as follows:

$$\bar{N} = \varphi(Att_N W^o, N) \quad (18)$$

$$\hat{L} = \varphi(Att_L W^o, L) \quad (19)$$

Figure 5B:
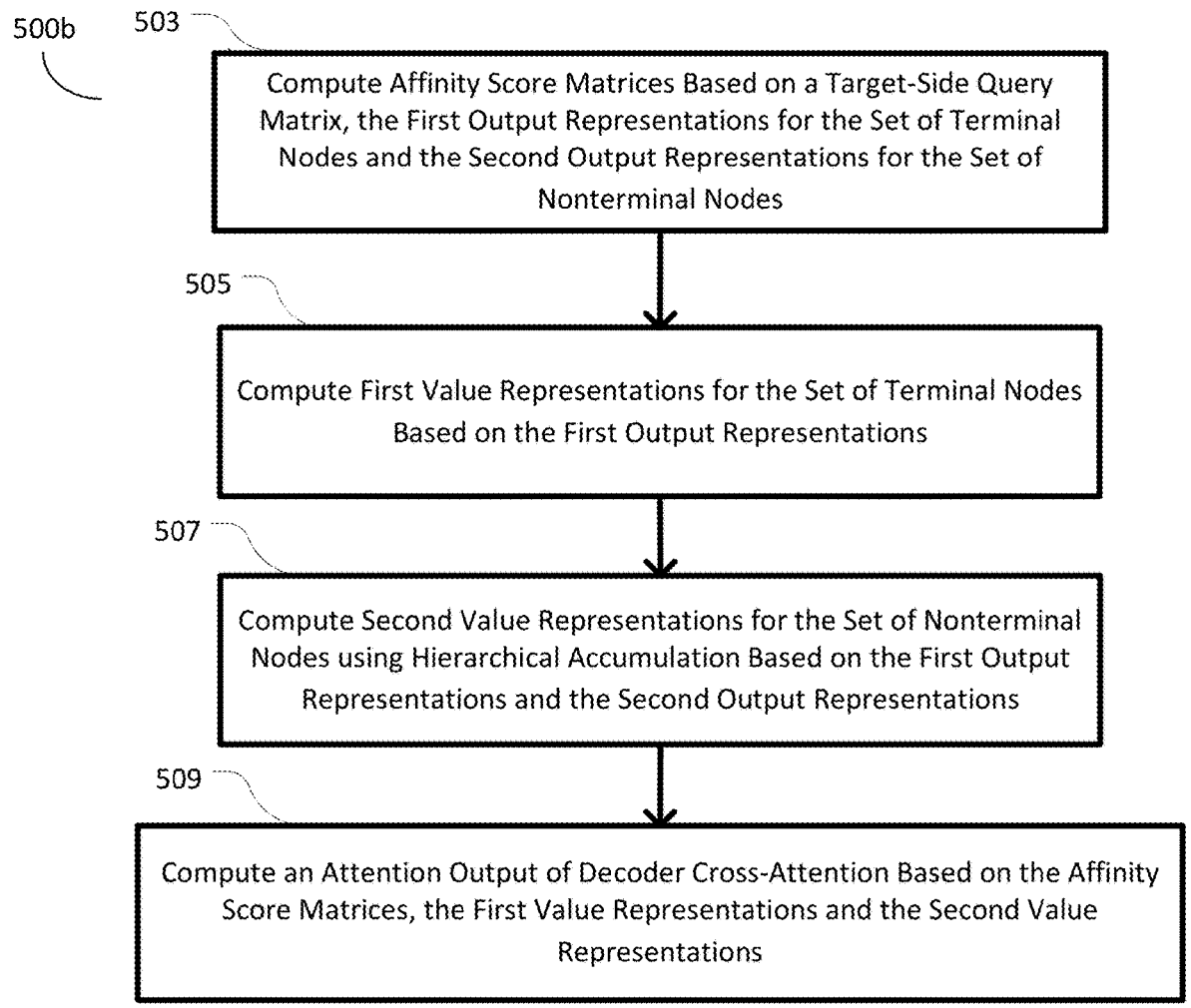
FIG. 5B is an example logic flow illustrating an example method for performing the decoder cross-attention described in FIG. 4B, according to some embodiments.

FIG. 4B is a simplified diagram illustrating a transformer framework structure integrating the hierarchical accumulation described in FIGS. 1A-3B for decoder cross-attention, and FIG. 5B is an example logic flow illustrating an example method 500b for performing the decoder cross-attention described in FIG. 4B, according to some embodiments. For tasks involving generation (e.g., neural machine translation), tree-based encode-decoder attention (or cross-attention) can be used in the decoder so that the target-side queries can leverage the hierarchical structures in the source side, e.g., tree to sequence. In FIG. 4B, network 402 illustrates an example structure for decoder cross-attention.

As shown in FIG. 5B, at step 503, affinity score matrices are computed based on a target-side query matrix, the output representations for the set of terminal nodes and the output representations for the set of nonterminal nodes. Specifically, the network 402 receives the target-side query matrix $Q \in \mathbb{R}^{t \times d}$ (407) and the source-side leaf and node matrices L (403) and N (405), and computes the affinity scores $A_{QN} \in \mathbb{R}^{t \times d_1}$ and $A_{QL} \in \mathbb{R}^{t \times n}$ through the linear layers 413 and 415:

$$A_{QN} = (Q'W^Q)(NW^K)^T/\sqrt{d} \quad (20)$$

$$A_{QL} = (Q'W^Q)(LW^K)^T/\sqrt{d} \quad (21)$$

At step 505, value representations for the set of terminal nodes are computed based on the output representations. At step 507, value representations for the set of nonterminal nodes are encoded using hierarchical accumulation based on the output representations for the terminal and nonterminal nodes:

$$\bar{N}' = \mathcal{V}(\mathcal{U}(\mathcal{F}_{(LW^V, NW^V, R)} + E), w); \bar{L} = LW^V \quad (22)$$

where $w = Lu_c$ with $u_c \in \mathbb{R}^d$ being a trainable vector.

At step 509, an attention output $Att_Q$ (425 in FIG. 4B) of decoder cross-attention is computed based on the affinity score matrices $A_{QN}$, $A_{QL}$ and the value representations $\bar{N}'$, $\bar{L}$:

$$Att_Q = S([A_{QN}; A_{QL}])[\bar{N}'; \bar{L}] \quad (23)$$

Unlike the self-attention encoder in FIGS. 4A and 5A, cross-attention does not adopt subtree masking because the queries are from another domain, instead of elements of the source tree. The self-attention encoder and cross-attention decoder illustrated in FIGS. 4A-5B runs competitively with the traditional Transformer network, due to constant parallel time complexity. In terms of sequential (single-CPU) computations, a time complexity of $O(N^2)$ may be achieved.

Specifically, the hierarchical accumulation process shown in FIGS. 2A-2B runs at runs at $O(N \log N)$ time, while the attention scores $(QK^T)$ in standard attention are computed at $\mathcal{O}(N^2)$. Overall, the tree-based attention can perform at $\mathcal{O}(N^2)$ time complexity, same as the Transformer. Let X be a n-length sentence with $\mathcal{T}(X) = (\mathcal{L}, \mathcal{N}, \mathcal{R})$ as its balance binary constituency parse tree, then there are m=n-1 non-terminal nodes in the tree, which is also the size of N. In the upward cumulative-average operation $\mathcal{U}$, each branch from the root to a leaf has≈log(n) nodes, the cumulative operation of these nodes can be done at $\mathcal{O}(\log(n))$. That is, because the result $y_i$ of each node $x_i$ can be computed as $y_i = y_{i-1} + x_i$, computations for all nodes in a branch take linear time using dynamic programming, yielding $\mathcal{O}(\log(n))$ time complexity. When there are n branches in the tree, the total complexity for $\mathcal{U}$ is $\mathcal{O}(n\log(n))$. Likewise, the weighted aggregation operation $\mathcal{V}$ is also computed at $\mathcal{O}(n\log(n))$ complexity. Specifically, at level i from the root of the tree, there are i non-terminal nodes, which each has to aggregate n/i components $\hat{S}_{i,j}$ to calculate the final representation of the node. Thus, at each level, there are n computations. Because the total height of the tree is log(n), the time complexity of $\mathcal{V}$ is also $\mathcal{O}(n\log(n))$. Hence, the total complexity of hierarchical accumulation process is $\mathcal{O}(n(n))$. As such, the final sequential time complexity of the proposed attention layer is:

$$\mathcal{O}_{(N^2)} + \mathcal{O}_{(N-1)^2} + \mathcal{O}_{(N(N-1)} + \mathcal{O}_{(N \log(N))} = \mathcal{O}_{(N^2)} \quad (24)$$

Thus, when a powerful GPU-based hardware is used, the tree-based attention models can achieve comparable parallelizability compared to the Transformer, while they can leverage the essence of hierarchical structures in natural languages.

FIG. 6 is a simplified diagram illustrating an example architecture of a tree-based attention transformer 600 for implementing the hierarchical accumulation process, according to embodiments described herein. The tree-based attention transformer 600 receives inputs of representations of the leaves 403, non-terminal nodes 405 and the target 407, as described in relation to FIGS. 4A-4B. The input of leaf representations 403 and nonterminal node representations 405 are fed to the self-tree attention encoder 601, which is similar to the network 401 described in FIG. 4A. The output encoded representations 611 and 613 from the encoder are then fed to a cross-tree attention decoder 605, which can be similar to the network 402 described in FIG. 4B.

In some embodiments, the input to the cross-tree attention decider 605 may be masked via the masking layer 608. Specifically, masking attentions can be used to filter out irrelevant signals. For example, in the decoder self-attention encoder of the Transformer, the affinity values between query $q_i$ and key $k_j$ are turned off for $j>i$ to avoid future keys being attended since they are not available during inference. This can be done by adding to the affinity $q_i^T k_j$ an infinitely negative value $(-\infty)$ so that the resulting attention weight (after softmax) becomes zero. In the context of tree-based attentions, subtree masking can be used for encoder self-attention, as in Eq. (16)-(17). That is, if a node-query $q_i^\mathcal{N} \in \mathcal{N}$ is attending to a set of node-keys $k_j^\mathcal{N} \in \mathcal{N}$ and leaf-keys $k_j^\mathcal{L} \in \mathcal{L}$, attentions are turned on only for affinity pairs whose key belongs to the subtree rooted at $q_i^\mathcal{N}$. In this way, each node-query has access only to its own subtree descendants, but not to its ancestors and siblings. On the other hand, if a leaf-query $q_i^\mathcal{L} \in \mathcal{L}$ is attending, only leaf-keys are turned on, like the Transformer. For example, as shown at subtree 611, given the query at position g, attentions are only included within the g-rooted subtree, while the remaining elements are masked out (shaded).

Specifically, given $a_{ij}$ as the affinity value between a node/leaf-query $q_i \in \mathcal{N} \cup \mathcal{L}$ and a node/leaf-key $k_j \in \mathcal{N} \cup \mathcal{L}$, the masking function is defined as:

$$\mu(a_{ij}) = \begin{cases} a_{ij} & \text{if } (q_i \in N \text{ and } k_j \in \mathcal{R}(q_i)) \text{ or } (q_i, k_j \in \mathcal{L}) \\ a_{ij} - \infty & \text{otherwise} \end{cases} \quad (26)$$

FIG. 7 is an example table illustrating example neural machine translation results using the hierarchical accumulation process described in FIGS. 1A-6, according to some embodiments. In FIG. 7, the impact of a constituency parsing prior on machine translation quality, as well as the effectiveness of the tree-based attention describe in FIGS. 1-6 are studied on several English-German (En-De), German-English (De-En), English-French (En-Fr) and French-English (Fr-En) translation tasks. The base training settings for the tree-based model are similar to those in Ott et al, Scaling neural machine translation, In Proceedings of the Third Conference on Machine Translation (WMT), 2018, which is hereby expressly incorporated herein by reference in its entirety. The performance of the tree-based attention model is compared with a traditional transformer-based methods described in Vaswani et al., Attention is all you need, In Advances in Neural Information Processing Systems, pp. 5998-6008, 2017 and Wu et al., Pay less attention with lightweight and dynamic convolutions, In International Conference on Learning Representations, 2019, which are both hereby expressly incorporated herein by reference in their entirety. The tree-based attention model is trained with approximate a batch size of 4000 tokens, 60000 updates. BPE (Sennrich et al., Neural machine translation of rare words with subword units. In Proceedings of the 54th Annual Meeting of the Association for Computational Linguistics (Volume 1: Long Papers), pp. 1715-1725, 2016) is used, in which a leaf word may form a subtree with BPE subwords as leaves. The Stanford CoreNLP parser introduced in Manning et al., the Stanford CoreNLP natural language processing toolkit, In Association for Computational Linguistics (ACL) System Demonstrations, pp. 55-60, 2014. 2014, is used to parse the datasets. The aforementioned references are all hereby expressly incorporated by reference herein in their entirety.

The table in FIG. 7 shows the experimental results for various machine translation tasks. The tree-based attention models (labeled as "AffValue" and "Value") outperform the base models ("Tree2Seq", "Transformer," and "Dynamic Cow") consistently in all tested tasks.

FIGS. 8A-8B are example tables illustrating example text classification results using the hierarchical accumulation process described in FIGS. 1A-6, according to some embodiments. The tree-based method described herein is compared with Tree-LSTM discussed in Tai et al., Improved semantic representations from tree-structured long short-term memory networks, In Proceedings of the 53rd Annual Meeting of the Association for Computational Linguistics and the 7th International Joint Conference on Natural Language Processing (Volume 1: Long Papers), pp. 1556-1566, Beijing, China, July 2015 and other sequence-based baselines on Stanford Sentiment Analysis (SST), IMDB Sentiment Analysis and Subject-Verb Agreement (SVA) (discussed in Linzen et al., Assessing the ability of LSTMs to learn syntax-sensitive dependencies, Transactions of the Association for Computational Linguistics, 4:521-535, 2016) classification tasks. A tiny size version of tree-based models and the Transformer baseline are adopted. For example, the constructed tree-based model possesses 2 transformer-layers, each having a model dimension of 64, 4 heads. The models are trained for 15,000 updates, with a batch size of 2048 tokens. Word embeddings are randomly initialized.

The table in FIG. 8A shows experimental results (accuracy %) for on various classification tasks implemented by the Stanford Sentiment Analysis task (SST), binary (SST-2) and fine-grained (SST-5) subtasks, and Subject-Verb Agreement (SVA) and IMDB Sentiment analysis. As seen, the tree-based model outperforms sequence-based baseline Transformer significantly. The finding suggests that given a small dataset, a constituency parsing prior can make outstanding contribution using our models, compared to vanilla Transformer. Furthermore, the proposed tree-based attention model also surpasses traditional Tree-LSTM in all mentioned tasks.

The table in FIG. 8B shows the contributions of each component of the tree-based attention model on English-German and Stanford Sentiment Analysis (SST) tasks. The legend "—HierEmb" refers to no hierarchical embeddings, and "—SubMask" refers to no subtree masking. As shown, removing either or both hierarchical embeddings and subtree masking method damages the model performance.

FIG. 9 is an example table illustrating example attention distributions (%) between phrases (nodes) and tokens (leaves) across language pairs using the hierarchical accumulation process, according to some embodiments. Specifically, the table in FIG. 9 how intensive the targets attend on leaves (tokens) and nodes (covering phrases). Although 60-66% of source trees are leaves, attentions on nodes over-whelm those on leaves (around 59% to 66%) consistently across languages, meaning the model slightly favors phrasal attentions. The results also suggest the attention concentrations are uncorrelated to leaves/nodes ratios but rather depends on the types of the language.

FIGS. 10A-10B provide example data plots illustrating training time and training data size analysis for the hierarchical accumulation process, according to some embodiments.

FIG. 10A reflects the empirical training time of Transformer, Tree Transformer and Tree-LSTM, with respect to the sequence length N of inputs. All the examined models are trained on text classification task on a GPU for 1000 training steps with batch-size of 1. As shown, Tree-LSTM's training time grows linearly with the sequence length. Meanwhile, the times of vanilla and Tree Transformer are much less than that of Tree-LSTM and remain relatively plateau with respect to the sequence length. The training time analysis demonstrates that the proposed tree-based attention model is competitive in terms of speed, as compared to Tree-LSTM or other recurrent/recursive based methods.

FIG. 10B shows how significant the tree-based attention model outperforms the traditional Transformer on English-German task, with regard to the amount of training data. As shown, the tree-based attention model improves bilingual evaluation understudy (BLEU) scores substantially when the data source is less than 1 million pairs, while the margin gradually diminishes as more data is available. This suggests that utilizing hierarchical prior can compensate the shortage of data in low-resource setups.

Some examples of computing devices, such as computing device 100 may include non-transitory, tangible, machine readable media that include executable code that when run by one or more processors (e.g., processor 110) may cause the one or more processors to perform the processes of method 200. Some common forms of machine readable media that may include the processes of method 200 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of using a transformer framework with tree-based attention for hierarchical encoding in natural language processing, comprising:
    obtaining, at the transformer framework, a pre-parsed constituency tree having a set of terminal nodes and a set of nonterminal nodes corresponding to a natural language sentence;
    encoding the natural language sentence at a transformer encoder of the transformer framework by:
        determining a set of paths from a root node of the pre-parsed constituency tree to each of the set of terminal nodes based on a structure of the pre-parsed constituency tree;
        computing a respective value component of each nonterminal node in the pre-parsed constituency tree by adding hidden states of descendant nodes of the respective nonterminal node along a specific path that includes the respective nonterminal node in a bottom-up manner, and
        computing a final representation of the respective nonterminal node in the pre-parsed constituency tree by applying weighted aggregation of respective value components corresponding to the respective nonterminal nodes over all paths that include the respective nonterminal node;
    generating an encoded representation of the natural language sentences based on the computed final representations of all nonterminal nodes; and
    generating a final representation of the set of nonterminal nodes based on attentions for the set of terminal nodes and the set of nonterminal nodes via serial computations of a transformer network.

2. The method of claim 1, further comprising:
    determining, based on the pre-parsed constituency tree, a first hidden representation vector corresponding to value components of the set of terminal nodes and a second hidden representation vector corresponding to value components of the set of nonterminal nodes;
    applying an interpolation function to the first hidden representation vector, the second hidden representation vector and a set of rules indexed by the set of nonterminal nodes; and
    obtaining a first tensor from the interpolation function, wherein the tensor has rows and columns arranged according to a structure of the pre-parsed constituency tree.

3. The method of claim 2, further comprising:
    computing a second tensor from the first tensor via an upward cumulative-average operation, wherein each element in the second tensor is computed by dividing a respective nonterminal node representation from the first tensor by a total number of all descendent nodes of the respective nonterminal node in a particular branch, and wherein each row of the second tensor represents a nonterminal node, and the each element of the second tensor represents a vector representation of the nonterminal node reflecting the particular branch.

4. The method of claim 3, wherein the computing, by weighted aggregation, the final representation of the set of nonterminal nodes in the pre-parsed constituency tree based on the encoding comprises:

applying a weighting vector to the each element of the second tensor; and for a particular nonterminal node from the set of nonterminal nodes, combining, into a single accumulation vector, weighed elements from the second tensor corresponding to vector representations of nonterminal nodes in a subtree rooted at the particular nonterminal node.

5. The method of claim 2, further comprising:
applying hierarchical embedding to the first tensor before elements of the first tensor is accumulated through an upward cumulative-average operation.

6. The method of claim 5, wherein the hierarchical embedding includes:
constructing a tensor of hierarchical embeddings,
wherein an entry of the tensor of hierarchical embeddings is computed by concatenating a first row vector from a vertical embedding matrix and a second row vector from a horizontal embedding matrix.

7. The method of claim 6, further comprising:
summing the first tensor with the tensor of hierarchical embeddings; and
applying the upward cumulative-average operation to the summed first tensor with the tensor of hierarchical embeddings.

8. The method of claim 1, further comprising:
applying a masking function to each node in the pre-parsed constituency tree based on a corresponding affinity value of the respective node,
wherein, when a node query is attending to a particular node in the pre-parsed constituency tree, the masking function prevents the node query from accessing node other than descendants of the particular node.

9. The method of claim 1, further comprising integrating encoder self-attention into the transformer framework by:
computing, via a tree-based self-attention layer, first output representations for the set of terminal nodes and second output representations for the set of nonterminal nodes;
generating a query-key affinity matrix based on a comparison of the first output representations and the second output representations;
computing first value representations for the set of terminal nodes based on the first output representations;
encoding second value representations for the set of nonterminal nodes using hierarchical accumulation based on the first output representations and the second output representations;
computing final attentions for the set of terminal nodes and the set of nonterminal nodes by taking weighted averages of the encoded second value representations and the first value representations; and
passing the final attentions through serial computations of a transformer network to generate the final representation of the set of nonterminal nodes.

10. The method of claim 9, further comprising integrating decoder cross-attention into the transformer framework by:
computing affinity score matrices based on a target-side query matrix, the first output representations for the set of terminal nodes and the second output representations for the set of nonterminal nodes;
computing first value representations for the set of terminal nodes based on the first output representations;
computing second value representations for the set of nonterminal nodes using hierarchical accumulation based on the first output representations and the second output representations; and
computing an attention output of decoder cross-attention based on the affinity score matrices, the first value representations and the second value representations.

11. A system for using a transformer framework with tree-based attention for hierarchical encoding in natural language processing, the system comprising:
a memory containing machine readable medium storing machine executable code; and
one or more processors coupled to the memory and configurable to execute the machine executable code to cause the one or more processors to:
obtain, at the transformer framework, a pre-parsed constituency tree having a set of terminal nodes and a set of nonterminal nodes corresponding to a natural language sentence;
encode the natural language sentence at a transformer encoder of the transformer framework by:
determining a set of paths from a root node of the pre-parsed constituency tree to each of the set of terminal nodes based on a structure of the pre-parsed constituency tree;
computing a respective value component of each nonterminal node in the pre-parsed constituency tree by adding hidden states of descendant nodes of the respective nonterminal node along a specific path that includes the respective nonterminal node in a bottom-up manner, and
computing a final representation of the respective nonterminal node in the pre-parsed constituency tree by applying weighted aggregation of respective value components corresponding to the respective nonterminal nodes over all paths that include the respective nonterminal node;
generate an encoded representation of the natural language sentences base on the computed final representations of all nonterminal nodes; and
generate a final representation of the set of nonterminal nodes based on attentions for the set of terminal nodes and the set of nonterminal nodes via serial computations of a transformer network.

12. The system of claim 11, further comprising:
determining, based on the pre-parsed constituency tree, a first hidden representation vector corresponding to value components of the set of terminal nodes and a second hidden representation vector corresponding to value components of the set of nonterminal nodes;
applying an interpolation function to the first hidden representation vector, the second hidden representation vector and a set of rules indexed by the set of nonterminal nodes; and
obtaining a first tensor from the interpolation function, wherein the tensor has rows and columns arranged according to a structure of the pre-parsed constituency tree.

13. The system of claim 12, wherein the machine executable code further causes the one or more processors to:
compute a second tensor from the first tensor via an upward cumulative-average operation, wherein each element in the second tensor is computed by dividing a respective nonterminal node representation from the first tensor by a total number of all descendent nodes of the respective nonterminal node in a particular branch, and
wherein each row of the second tensor represents a nonterminal node, and the each element of the second tensor represents a vector representation of the nonterminal node reflecting the particular branch.

14. The system of claim 13, wherein the machine executable code further causes the one or more processors to compute, by weighted aggregation, the final representation of the set of nonterminal nodes in the pre-parsed constituency tree based on the encoding by:
applying a weighting vector to the each element of the second tensor; and
for a particular nonterminal node from the set of nonterminal nodes, combining, into a single accumulation vector, weighed elements from the second tensor corresponding to vector representations of nonterminal nodes in a subtree rooted at the particular nonterminal node.

15. The system of claim 12, wherein the machine executable code further causes the one or more processors to:
apply hierarchical embedding to the first tensor before elements of the first tensor is accumulated through an upward cumulative-average operation.

16. The system of claim 15, wherein the hierarchical embedding includes:
constructing a tensor of hierarchical embeddings,
wherein an entry of the tensor of hierarchical embeddings is computed by concatenating a first row vector from a vertical embedding matrix and a second row vector from a horizontal embedding matrix.

17. The system of claim 16, wherein the machine executable code further causes the one or more processors to:
sum the first tensor with the tensor of hierarchical embeddings; and
apply the upward cumulative-average operation to the summed first tensor with the tensor of hierarchical embeddings.

18. The system of claim 11, wherein the machine executable code further causes the one or more processors to:
apply a masking function to each node in the pre-parsed constituency tree based on a corresponding affinity value of the respective node,
wherein, when a node query is attending to a particular node in the pre-parsed constituency tree, the masking function prevents the node query from accessing node other than descendants of the particular node.

19. The system of claim 11, wherein the machine executable code further causes the one or more processors to integrate encoder self-attention into the transformer framework by:
computing, via a tree-based self-attention layer, first output representations for the set of terminal nodes and second output representations for the set of nonterminal nodes;
generating a query-key affinity matrix based on a comparison of the first output representations and the second output representations;
computing first value representations for the set of terminal nodes based on the first output representations;
encoding second value representations for the set of nonterminal nodes using hierarchical accumulation based on the first output representations and the second output representations;
computing final attentions for the set of terminal nodes and the set of nonterminal nodes by taking weighted averages of the encoded second value representations and the first value representations; and
passing the final attentions through serial computations of a transformer network to generate the final representation of the set of nonterminal nodes.

20. The system of claim 19, wherein the machine executable code further causes the one or more processors to integrate decoder cross-attention into the transformer framework by:
computing affinity score matrices based on a target-side query matrix, the first output representations for the set of terminal nodes and the second output representations for the set of nonterminal nodes;
computing first value representations for the set of terminal nodes based on the first output representations;
computing second value representations for the set of nonterminal nodes using hierarchical accumulation based on the first output representations and the second output representations; and
computing an attention output of decoder cross-attention based on the affinity score matrices, the first value representations and the second value representations.

* * * * *